C. M. SCHUYLER.
AUTOMATIC MOTOR CYCLE STAND CATCH.
APPLICATION FILED OCT. 16, 1916.
1,233,512.
Patented July 17, 1917.
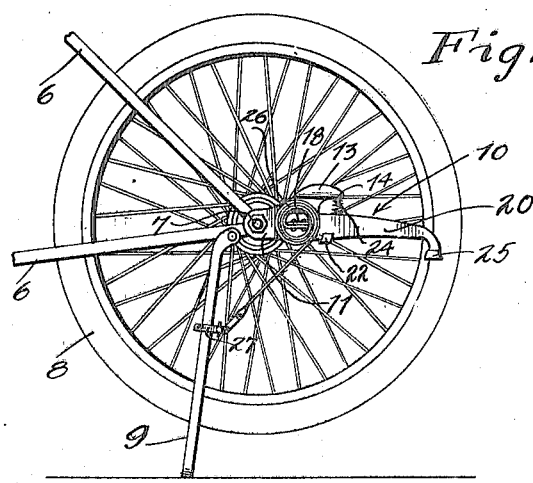
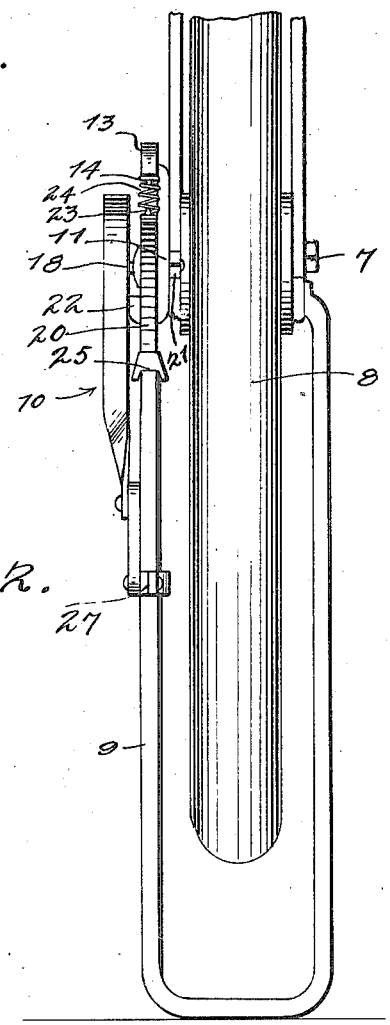
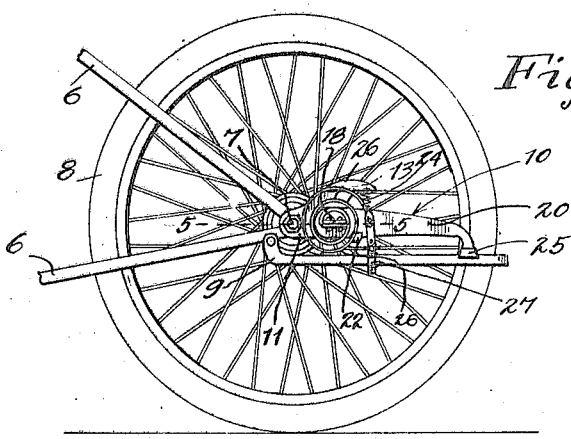
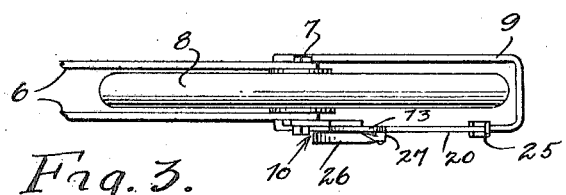
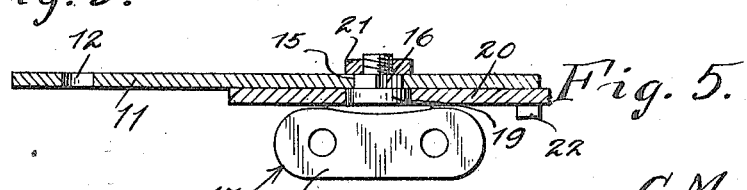
Inventor
C. M. Schuyler.

UNITED STATES PATENT OFFICE.

CLYDE M. SCHUYLER, OF PLEVNA, KANSAS.

AUTOMATIC MOTOR-CYCLE-STAND CATCH.

1,233,512.  Specification of Letters Patent.  Patented July 17, 1917.

Application filed October 16, 1916. Serial No. 125,946.

*To all whom it may concern:*

Be it known that I, CLYDE M. SCHUYLER, a citizen of the United States, residing at Plevna, in the county of Reno, State of Kansas, have invented certain new and useful Improvements in Automatic Motor-Cycle-Stand Catches; and I do hereby declare the following to be a full, clear, and exact description of the invention, such as will enable others skilled in the art to which it appertains to make and use the same.

This invention relates to improvements in motorcycle appliances and is directed more particularly to a device for automatically elevating the supporting stand of a motorcycle to inactive position when the weight of the motorcycle thereon is relieved.

An object of the present invention is to provide an attachment of the character specified which is capable of general application without alteration to the construction of the motorcycle.

It is further a purpose of this invention to provide such an attachment that will combine the desired features of simplicity, efficiency, and reliability and which may be manufactured and marketed at a relatively low cost.

With the above and other objects of similar nature in view, the invention consists in the construction, combination, and arrangement of parts, set forth in and falling within the scope of the appended claims.

In the drawing:

Figure 1 is a side elevation of the rear portion of a motorcycle with the invention associated therewith and the supporting stand in operative position.

Fig. 2 is a similar view with the parts in the position to maintain the supporting stand in inactive position.

Fig. 3 is a top plan view of what is shown in Fig. 2.

Fig. 4 is a rear view taken of what is shown in Fig. 1 and

Fig. 5 is a sectional view taken on the line 5—5 of Fig. 2.

Referring now more particularly to the accompanying drawing, there is shown the rear portion of a motorcycle of conventional type including the frame 6, rear hub bolt 7, wheel 8, and supporting stand 9. The invention is designated generally at 10 and comprises a plate 11, preferably of the shape illustrated and provided at one end with a transverse opening 12 through which the hub bolt 7 is passed for securing the attachment in applied position.

The plate 11 has formed integrally with its upper edge at a point remote from the opening 12 a curved and tapered extension 13, said extension being slightly offset from the plane of the plate and provided at its free end with a downward projection 14, the purpose of which will subsequently appear. Formed in the intermediate portion of the plate is a rectangular opening 15 in which is fitted the rectangular shoulder 16 of a specially constructed bolt 17. This bolt 17 is provided at one end with a flattened head 18 while that portion thereof directly adjacent this head is rounded as at 19, and has pivotally mounted thereon an arm 20, said arm extending rearwardly in a substantially horizontal plane when the device is in applied position.

The opposite end of the bolt 17 from the head 18 is threaded to receive a nut 21 by which the various parts are securely held assembled.

For limiting pivotal movement of the arm 20 in one direction there is formed integrally with the plate 11 a stop 22, while said arm has formed on its upper edge a projection 23, a coil spring 24 being engaged with this projection and with the projection 14 on the plate 11, and adapted to normally urge the arm into engagement with the stop 22.

At the free end of the arm 20 there is carried a rubber stop or buffer 25 with which one leg of the stand 9 is engaged and held when in inactive position, rattling of the parts being thus prevented. For moving and maintaining the stand 9 in inactive position there is provided a relatively heavy clock spring 26, the inner end of which is riveted or otherwise suitably secured to the flattened head 18 of the bolt 17 while at the outer or free end of the spring there is carried a clamp 27 detachably engaged with the stand as clearly illustrated.

Thus when the motorcycle is not in use the stand 9 is swung downwardly on its pivot in the usual manner, thereby placing the spring 26 under tension, so that when the machine is moved off the stand and its weight thereon relieved, said spring will serve to relieve the stand to normal or inactive position, the shock of contact of the stand with the arm 20 being effectively absorbed by the spring 24 and the various parts thus relieved of unnecessary strain.

What I claim is:

1. A stand holding attachment for motor-cycles consisting of a plate adapted for rigid attachment to the motor-cycle frame, a pivot bolt fixed to the plate, an arm pivoted on the bolt for movement with respect to the plate, means for limiting movement of the arm in opposite directions, a spring secured at one end to the bolt, and means at the free end of the spring for attachment to the motor-cycle stand, said spring being operable to elevate and hold the stand in inactive position against the arm.

2. The combination with a motor-cycle and its supporting stand, of a plate rigidly attached to the motorcycle, an arm pivoted on the plate, a stop on the plate for limiting movement of the arm in one direction, a spring connected at one end with the plate and at its opposite end with said stand, whereby to elevate and hold the stand in inactive position against the arm when the weight of the motorcycle is relieved from the stand, and means interposed between the plate and arm for absorbing the shock when said stand is swung into contact with the arm.

In testimony whereof, I affix my signature, in the presence of two witnesses.

CLYDE M. SCHUYLER.

Witnesses:
A. W. HOFFMAN,
A. F. SWITZER.

Copies of this patent may be obtained for five cents each, by addressing the "Commissioner of Patents, Washington, D. C."